United States Patent [11] 3,608,977

| [72] | Inventor | Raymond J. Kersting |
| | | Dellwood, Mo. |
| [21] | Appl. No. | 864,483 |
| [22] | Filed | Oct. 7, 1969 |
| [45] | Patented | Sept. 28, 1971 |
| [73] | Assignee | Wagner Electric Corporation |
| | | Newark, N.J. |

[54] CONTROL VALVE
14 Claims, 4 Drawing Figs.

[52] U.S. Cl. .................................................... 303/6 C,
 60/54.5 E, 188/151 A, 188/349, 200/82 D, 303/84
 A, 340/52 C
[51] Int. Cl. ................................................. B60t 8/26,
 B60t 17/22, B60t 11/34
[50] Field of Search ........................................ 303/6, 6 C,
 22, 22 A, 84, 84 A; 188/152, 152.11, 151, 151.11;
 200/82, 82.3; 60/54.5 E; 340/52 C

[56] References Cited
UNITED STATES PATENTS

| 3,450,443 | 6/1969 | Bueler | 303/6 |
| 3,464,741 | 9/1969 | Falk | 303/6 |
| 3,472,559 | 10/1969 | Bueler | 303/6 |
| 3,498,681 | 3/1970 | Beuler | 303/6 |

Primary Examiner—Milton Buchler
Assistant Examiner—John J. McLaughlin
Attorney—Joseph E. Papin ABSTRACT: A control valve for use in a dual or split brake system having a switch-operating piston movable from a centered position toward opposed translated positions in response to a predetermined differential between separately supplied fluid pressures acting thereon and a metering piston normally movable to effect a metered application through said control valve of one of the supplied fluid pressures. A bypass passage is provided through the metering piston for connecting the one supplied fluid pressure and the applied fluid pressure in open pressure fluid communication to obviate the metering function of the metering piston, and the switch-operating piston is provided with a portion slidable in one end of the bypass passage to normally interrupt pressure fluid communication therethrough between the one supplied fluid pressure and the applied fluid pressure when said switch-operating piston is in its centered position.

PATENTED SEP 28 1971 3,608,977

INVENTOR
RAYMOND J. KERSTING
BY
*Joseph E. Papin.*

CONTROL VALVE

This invention relates to dual fluid pressure systems in general and in particular to control valves for controlling pressure fluid flow through one of said systems.

In the past, control valves, such as a combination-type driver warning and proportioning valve, were utilized in a dual or split braking system having a switch-operating piston therein for energizing a driver warning or dash lamp in the event of a fluid pressure failure in one of the split systems and also having a proportioning or metering piston therein for proportioning the fluid pressure applied to the split system connected with the vehicle rear brakes. Such combination-type valves were also provided with a bypass feature or construction which by passed fluid pressure around the proportioning piston to obviate the proportioning function thereof in the event of a fluid pressure failure in the split system connected with the vehicle front brakes in order to utilize the maximum available fluid pressure for braking during such an emergency condition; however, one of the disadvantageous features of such past combination valves was that the inherent operating characteristics of the switch-operating piston and proportioning piston were separately utilized to effect the bypass function of said combination valve and also special passage means was provided in the housing of said combination-type valve to accommodate such bypass function.

The primary object of the present invention is to provide a control valve which overcomes the aforementioned disadvantageous or undesirable features, and this, as well as other objects and advantageous features of the present invention, will become apparent hereinafter.

Briefly, the present invention comprises a control valve having a housing, means movable in said housing from a normally centered position toward opposed translated positions in response to a predetermined differential between separate fluid pressures supplied to said housing, other means for effecting a metered application through said housing of one of the supplied fluid pressures, and bypass passage means in said other means for connecting the one supplied fluid pressure and the applied fluid pressure in open pressure fluid communication to obviate metering actuation of said other means, said first-named means including means movable in said bypass passage means and normally interrupting pressure fluid communication therethrough between said one supplied fluid pressure and the applied fluid pressure when said first-named means is in its centered position, and said included means being movable to a position opening said bypass passage means to establish open pressure fluid communication therethrough between the one supplied fluid pressure and the applied fluid pressure upon the movement of said first-named means toward one of its translated positions.

In the drawings wherein like numerals refer to like parts wherever they occur:

Figure 2:
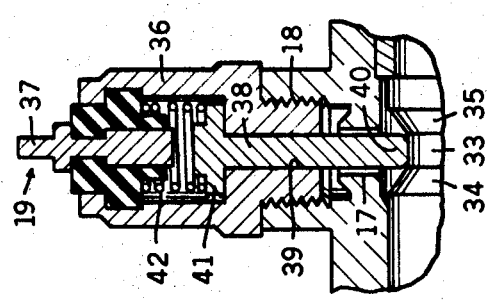
FIG. 2 is a partial sectional view taken along line 2—2 of FIG. 1.
Figure 1:
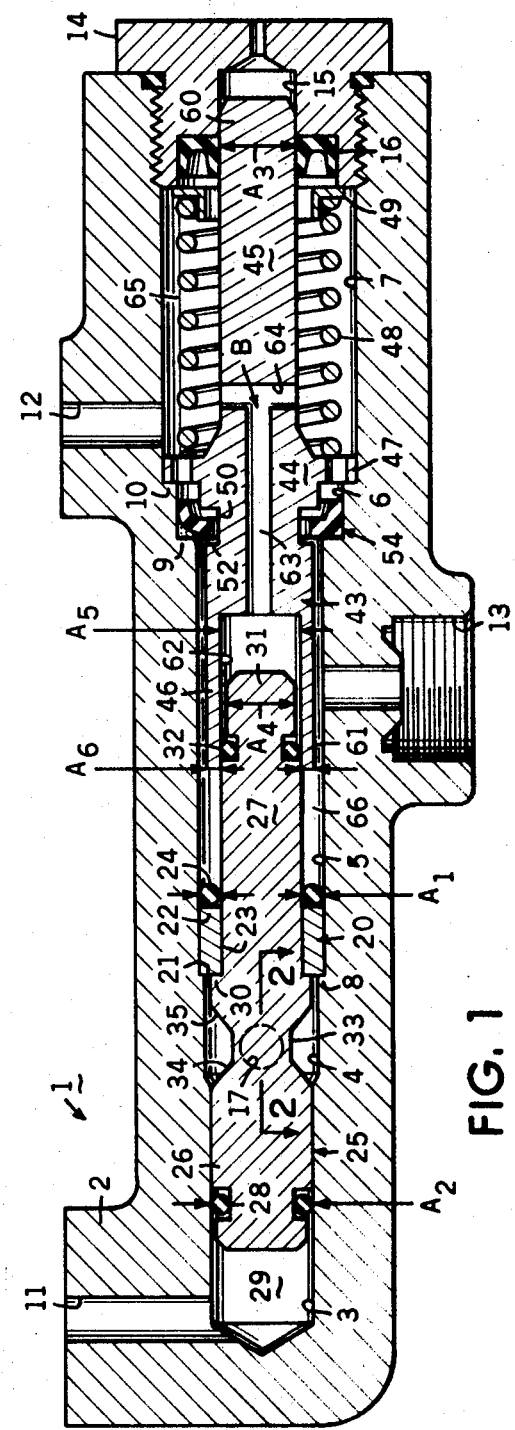
FIG. 1 is a sectional view showing a control valve embodying the present invention in cross section.

Referring now to the drawings in detail and in particular to FIG. 1, a control valve 1 is provided with a housing 2 which is adapted for direct connection with the housing of a dual or split system master cylinder (not shown); however, if desired, said control valve can be remotely positioned with respect to said master cylinder, as is well known in the art. The housing 2 is provided with a bore 3 substantially in axial alignment with stepped counterbores 4, 5, 6, and 7, and shoulders 8, 9 and 10 are provided on said housing between counterbores 4 and 5, 5 and 6, and 6 and 7, and shoulders 8, 9 and 10 are provided on said housing between counterbore 4 and 5, 5 and 6, and 6 and 7, respectively. Inlet ports 11, 12, which are adapted for connection with separate fluid-pressure-generating chambers of the split system master cylinder, are provided in the housing 2 intersecting with the bore 3 and counterbore 7, respectively, and an outlet port 13, which is adapted for connection with one of the rear and front vehicle brakes (not shown), is also provided in said housing intersecting with the counterbore 5. A closure member or end plug 14 is threadedly received in the rightward or open end of the counterbore 7 having a centrally located guide bore 15 therein, and a seal 16 is also positioned in said closure member about said guide bore. Referring now also to FIG. 2, a cross-bore 17 is also provided in the housing 2 having one end intersecting with the counterbore 4 and the other end thereof connecting with a cross-counterbore 18 which is threaded at its open end to receive an electrical switch 19, to be discussed hereinafter.

A centering member or piston 20 is slidably received in the counterbore 5 having opposed ends or abutment surfaces 21, 22, and an axially extending bore 23 is provided through said centering piston between said opposed ends thereof. An O-ring seal 24 is sealably engaged between the counterbore 5 and the rightward end 22 of the centering piston 20, and the leftward opposed end 21 thereof is normally engaged with the housing shoulder 8, said O-ring and rightward end of said centering piston defining an annular effective area $A_1$ subjected to the fluid pressure at the outlet port 13 at all times.

A reciprocal switch-actuating member or piston, indicated generally at 25, is shown in its centered or normal position in the housing 2 having spaced opposed annular extensions or portions 26, 27 thereon. The switch piston extension 26 is slidably received in the housing bore 3, and a peripheral seal 28 is carried on said extension in sealing engagement with said housing bore. The sealing engagement of the seal 28 with the bore 3 defines an effective cross-sectional area $A_2$ on the extension 26 which is subjected to the fluid pressure at the inlet port 11 at all times, and an inlet chamber 29 is defined in said bore between the leftward end wall thereof and the switch piston extension 26 in open pressure fluid communication with said inlet port. The switch piston extension 27 is slidably received in the centering piston bore 23 and extends through the O-ring seal 24 in sealing engagement therewith, and an annular shoulder 30 is provided on said switch piston extension for driving engagement with the leftward end 21 of the centering piston 20. The switch piston extension 27 also protrudes coaxially into the housing counterbore 5 having a free end 31 thereon, and a peripheral seal or valve member 32 is carried on said switch piston extension adjacent the free end 31 thereof, to be discussed hereinafter. The switch piston 25 is also provided with a switch-positioning portion or land 33 between the extensions 26, 27, said land being aligned with the housing cross-bore 17 when said switch piston is in its centered position (as shown), and peripheral cam faces or surfaces 34, 35 are also provided on said switch piston on opposite sides of said land.

The switch 19, as previously mentioned, is provided with a conductive closure or plug member 36 threadedly received in the open end of the housing cross-counterbore 18, and a metal terminal 37 extends through said plug member being insulated therefrom, said terminal having an exterior end for connection with an electrical circuit of a type well known to the art for selectively energizing a driver warning or dash lamp (not shown). A conductive switch member 38 is slidably received in a bore 39 provided in the switch plug 36 in electrical contact or conductive engagement therewith, and said switch member is provided with a follower portion or lower end 40 extending through the housing cross-bore 17 into following engagement with the land 32 and cams 33, 34 of the switch piston 25. The switch member 38 is also provided with an upper end 41 defining a contact for electrical contact or conductive engagement with the interior end of the terminal 37, and a switch spring 42 urges the contact 41 from said terminal end and the follower end 40 toward engagement with the switch piston 25.

Figure 4:
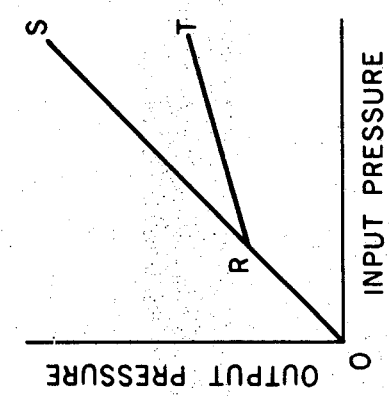
FIG. 4 is a graphical representation illustrating the output or applied fluid pressure effected by the control valve of FIG. 1 in response to the input or supplied fluid pressure.
Figure 3:
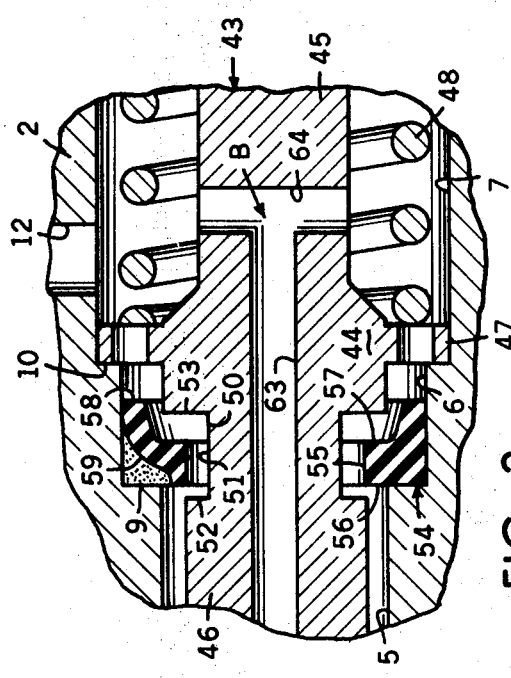
FIG. 3 is an enlarged fragmentary view taken from FIG. 1.

Referring now to FIGS. 1 and 3, a metering or proportioning member or piston, indicated generally at 43, is provided with a head portion 44 integrally formed with and interposed between opposed reduced extensions 45, 46. The head 44 is provided with a plurality of radially extending, hexagonally shaped guides 47 slidably engaged with the counterbore 7, and a proportioning or metering spring 48 is precompressed between said head and a retainer 49 to respectively urge said guides and retainer into abutment with the housing shoulder 10 and the interior end of the closure member 14. An annular peripheral groove 50 is provided in the proportioning piston head 44 having an annular base wall 51 interposed between radially extending sidewalls 52, 53, said sidewall 52 defining a valve member for engagement with an annular sealing or seating member 54. The sealing member 54 is provided with an annular base portion 55 radially spaced from the groove base wall 51 and interposed between opposed sides 56, 57. The seal side 56 is normally seated in abutting engagement with the housing shoulder 9, and defines a valve seat for engagement with the valve member or groove sidewall 52. The seal 54 is also provided with an annular peripheral lip 58 in sealing engagement with the housing counterbore 5, and a plurality of radially extending return flow passages 59 are provided between the seal side 56 and said lip 50, said return flow passages normally being closed by the sealing engagement of said seal lip with said housing counterbore.

The proportioning piston extension 45 extends coaxially through the housing counterbore 7 having an end portion 60 extending through the closure member seal 16 in sealing engagement therewith and slidably received in the closure member bore 15. The sealing engagement of the extension end portion 60 with the closure member seal 16 defines an effective area $A_3$ which is subjected to the atmosphere at all times. The proportioning piston extension 46 extends coaxially into the housing counterbore 5 having a free end 61 therein and a pair of stepped bores 62, 63 are provided in the proportioning piston 43. The larger stepped bore 62 intersects the free end 61 of the proportioning piston extension 43 for connection in pressure fluid communication with the outlet port 13 through the housing counterbore 5, and the smaller stepped bore 63 intersects with a cross-passage 64 which is in open pressure fluid communication with the inlet port 12 through the housing counterbore 7 at all times. The stepped bores 62, 63 and cross-passage 64 define a bypass passage, indicated generally at B, through the proportioning piston 43 for connection in pressure fluid communication between the inlet and outlet ports 12, 13 to obviate the metering function of said proportioning piston, as discussed hereinafter. The rightward or free end 31 of the switch piston extension 27 is slidably received in the proportioning piston larger stepped bore 62 when the switch piston 25 is in its centered position (as shown), and the seal 32 is normally engaged with said proportioning piston larger stepped bore to normally interrupt pressure fluid communication therethrough between the inlet and outlet ports 12, 13. In this manner, the bypass passage B is normally closed by the sealing engagement of the valve member 32 with the proportioning piston larger stepped bore 62 which defines a valve seat for said valve member.

The sealing engagement of the seal 32 with the larger stepped bore 62 defines an effective area $A_4$ on the switch piston extension 27 which is subjected to the fluid pressure at the inlet port 12, said area $A_4$ being opposed to and less than the area $A_2$ and additive to the area $A_1$. The additive areas $A_1$, $A_4$ are greater than the opposing area $A_2$. Another effective area $A_5$ is provided on the proportioning piston 42 and substantially defined by the cross-sectional area of the larger stepped bore 61, said area $A_5$ being subjected to the fluid pressure at the inlet port 12 at all times. The area $A_5$ is opposed and substantially equal to the area $A_3$. An annular effective area $A_6$ additive to the area $A_5$ is defined on the proportioning piston extension 45 substantially between the periphery of the propositioning piston extension 46 and the larger stepped bore 62, said area $A_6$ being subjected to the fluid pressure at the outlet port 13 at all times, and the additive areas $A_5$, $A_6$ are greater than the opposing area $A_3$. To complete the description of the control valve 1, another inlet chamber 65 is defined in the housing counterbores 6, 7 between the seal member 54 and the closure member 14 in open pressure fluid communication with the inlet port 12 at all times, and an outlet chamber 66 is defined in the housing counterbore 5 between the seal members 24, 53 in open pressure fluid communication with the outlet port 13 at all times, said inlet and outlet chambers being connected in open pressure fluid communication through the proportioning piston groove 50 when the proportioning piston 43 is in its normal or inoperative position, as shown.

In the operation with the component parts of the control valve 1 positioned as shown in the drawings and as described hereinafter, separately supplied or input fluid pressures $P_1$, $P_2$ normally having substantially equal magnitudes are supplied upon actuation of a tandem or split system master cylinder (not shown) to the inlet ports 11, 12, respectively, of said control valve. The input fluid pressure $P_1$ flows from the inlet port 11 into the inlet chamber 29 acting on the area $A_2$ of the switch piston 25 to establish a force $P_1 A_2$, and the input fluid pressure $P_2$ flows from the inlet port 16 into the inlet chamber 65 and therefrom through the proportioning piston groove 50 and the outlet chamber 66 to establish an output or applied fluid pressure $Po$ at the outlet port 13 having a magnitude substantially equal to that of the input fluid pressure $P_2$. The input fluid pressure $P_2$ also flows from the inlet chamber 65 through the proportioning piston cross-passage 64 and smaller stepped bore 63 into the larger stepped bore 62 acting on the effective area $A_4$ of the switch piston 25 to establish a force $P_2 A_4$ which is additive to the force of the output fluid pressure $Po$ in the outlet chamber 66 acting on the effective area $A_1$ of the centering piston 20. Since the area $A_2$ is greater than the area $A_4$ and the fluid pressure $P_1$, $P_2$ are substantially equal, the force $P_1 A_2$ urges the switch piston 25 rightwardly against the force $P_2 A_4$ to drivingly engage the switch piston shoulder 30 with the centering piston end 21, but since the additive areas $A_1$, $A_4$ are greater than the area $A_2$, the forces $Po A_1$, $P_2 A_4$ are also additive and opposed to the force $P_1 A_2$ thereby normally preventing the rightward movement of said switch piston from its normal or centered position. The force $Po A_1$ urges the centering piston 20 leftwardly to engage the end 21 thereof with the housing shoulder 8; therefore, since the area $A_4$ is less than the area $A_2$, the force $P_2 A_4$ is ineffective to move the switch piston 25 leftwardly from its centered position against the opposing force $P_1 A_2$ when said centering piston is urged into engagement with said housing shoulder by the force $Po A_1$. In this manner, the switch piston 25 is normally maintained in its centered position so long as the magnitudes of the supplied fluid pressures $P_1$, $P_2$ are within a predetermined differential.

The input fluid pressure $P_2$ acts on the difference between the effective areas $A_5$, $A_6$ and $A_3$ of the proportioning piston 43 to establish an input force $P_2 (A_5+A_6-A_3)$. The output fluid pressure acts on the effective area $A_6$ of the proportioning piston 43 to establish a force $Po A_6$, and the input fluid pressure $P_2$ acts on the area $A_5$ to establish a force $P_2 A_5$ which is additive to the force $Po A_6$ to provide an output force $Po A_6+P_2 A_5$. The output force $Po A + P_2 A_5$ is opposed to the input force $P_2 (A_5+A_6-A_3)$. Since the initial input and output fluid pressures $P_2$, $Po$ are initially equal and since the areas $A_5$, $A_6$ are greater than the area $A_3$ of the proportioning piston 43, it is obvious that the output force $Po A_6+P_2 A_5$ is greater than the input force $P_2 (A_5+A_6-A_3)$; however, the compressive force $Fc$ of the proportioning spring 48 is additive to the input force $P_2 (A_5+A_6-A_3)$ and thereby movement of the proportioning piston 43 is prevented until the input and output fluid pressures $P_2$, $Po$ exceed a predetermined value R, as shown by the line OR in the graphical representation of FIG. 3. When the predetermined value R of the input and output fluid pressures $P_2$, $Po$ is attained, the output force $Po A_6+P_2 A_5$ overcomes the additive input and spring forces $P_2 (A_5+A_6-A_3)$, $Fc$ to move the proportioning piston 43 rightwardly against the spring 48 from its normal or inoperative position toward a position isolating the input fluid pressure $P_2$ from the output fluid pressure $Po$ and engaging the valve member 52 with the valve seat 56 of the sealing member 54. When the proportioning piston 43 is in its isolating position with the valve 52 engaged with the valve seat 56, the proportioning piston groove 50 is closed to interrupt pressure fluid communication between the inlet and outlet ports 12, 13 and the guides 47 of said proportioning piston are disengaged from the housing shoulder 10.

From the graph of FIG. 3, it is obvious that the increases in the magnitude of the input fluid pressure $P_2$ in excess of the predetermined value R, as illustrated by the line RS in said graph, would result in proportionally reduced increases in the output fluid pressure $Po$, as illustrated by the line RT of said graph. For instance, when the input fluid pressure $P_2$ is increased to a value in excess of the predetermined value R, the input force $P_2 A_5 + A_6 - A_3$ is correspondingly increased and additive to the spring force Fc to overcome the output force $Po$ $A_6 + P_2 A_5$; therefore, the proportioning piston 43 is moved leftwardly from its isolating position toward a metering position disengaging the valve member 52 from the valve seat 56 to effect a metered application of the increased input fluid pressure $P_2$ through the proportioning piston groove or passage 50 into the outlet chamber 66 to effect a proportional or ratioed increase in the output fluid pressure $Po$ at the outlet port 13, as shown by the line RT in the graph of FIG. 3, wherein $$P_o = \frac{P_2(A_6 - A_3) + F_c}{A_6}$$

Of course, the increased input and output fluid pressures $P_2$, $Po$ in excess of the predetermined value R effect a corresponding increase in the output force $Po A_6 + P_2 A_5$, and when the increased output force $Po A_6 + P_2 A_5$ attains an increased value substantially equal to the increased input force $P_2 (A_5 + A_6 - A_3)$ and the spring force Fc, the proportioning piston 43 is again moved rightwardly toward its isolating position to reposition the valve member 52 in lapped engagement with the valve seat 56 and again isolate the increased input and output fluid pressures $P_2$, $Po$. It is, of course, obvious that the proportioning piston 43 will be responsive to further increases in the input fluid pressure $P_2$ to effect further proportional increases in the output fluid pressure $Po$ in the same manner as previously described, and it should also be noted that as the input fluid pressure $P_2$ is increased, a separate input fluid pressure $P_1$ is also substantially equally increased which obviates displacement or translatory movement of the switch piston 25 from its centered position.

When the split system master cylinder is deactuated, the input fluid pressures $P_1$, $P_2$ are vented to the atmosphere which eliminates the forces $P_1 A_2$, $P_2 A_4$ acting on the switch piston 25 and the force $P_2 A_1$ acting on the centering piston. The venting of the input fluid pressure $P_2$ also eliminates the input force $P_2 (A_5 + A_6 - A_3)$ acting on the proportioning piston 43, and since the force $P_2 A_5$ is also eliminated, the output force is also reduced to $Po A_6$. Upon the elimination of the input fluid pressure $P_2$, the output fluid pressure $Po$ acting on the sealing member 54 displaces the side 56 and lip 58 from sealing engagement with the housing shoulder 9 and the counterbore 7, respectively, and in this manner, the applied or output fluid pressure $Po$ returns from the outlet port 13 through the outlet chamber 66 and past the displaced side 56 and lip 58 of the sealing member 54 through the return flow passages 59 thereof into the inlet chamber 65 to the inlet port 12. When the output fluid pressure $Po$ is so reduced to correspondingly reduce the output force $Po A_6$ to a value less than the metering spring force Fc, the metering spring 48 moves the proportioning piston 43 leftwardly toward its original position reengaging the guides 47 thereof with the housing shoulder 10 and displacing the valve member 52 from its seat 56 on the sealing member 54 to again open the proportioning piston passage 55 reestablishing open pressure fluid communication therethrough between the inlet and outlet ports 12, 13 to effect complete elimination of the output fluid pressure $Po$.

In the event of the failure of the input fluid pressure $P_1$ due to a malfunction of the split system master cylinder or other leaks or the like, it is, of course, desirable to obviate the metering or proportioning function or actuation of the proportioning piston 43 and effect the application of an unaltered or unmetered fluid pressure to the outlet port 13 in order to utilize the maximum available pressure for energizing $Po$ brake set connected with said outlet port under such emergency conditions; therefore, when the magnitude of the input fluid pressure $P_2$ exceeds that of the failed input fluid pressure $P_1$ by a predetermined value, the force $P_2 A_4$ acting on the switch piston 25 will displace said switch piston leftwardly toward a displaced or translated position in the housing 2 and relative to the proportioning piston 42. This leftward translatory movement of the switch piston 25 disengages the seal 32 on the rightward extension 27 of said switch piston from sealing engagement with the larger stepped bore 62 of the proportioning piston 43 to permit the bypass flow of the inlet fluid pressure $P_2$ from the inlet port 12 through the inlet chamber 65, the cross-passage 64 and smaller stepped bore 63 of said proportioning piston into the larger stepped bore 62 and therefrom through the outlet chamber 66 to the outlet port 13 in bypass relation with the proportioning piston 43 to obviate metering actuation thereof, and it is, of course, obvious that the input and output fluid pressures $P_2$, $Po$ are equal when the bypass passage B is opened to effect the application of the maximum available fluid pressure to the vehicle brake set connected with said outlet port under the emergency condition. Furthermore, the leftward translatory movement of the switch piston 25 also drivingly engages the cam surface 35 with the switch member follower end 40 to drive the switch member 38 upwardly and effect the engagement of the switch member contact 41 with the interior end of the terminal 37 against the negligible force of the switch spring 42 thereby completing the electrical circuit for energizing the driver warning or dash lamp (not shown).

The control valve 1 functions in substantially the same manner to complete the electrical circuit and energize the driver warning dash lamp in the event of the alternative failure of the input fluid pressure $P_2$ wherein the force of the input fluid pressure $P_1$ acting on the area $A_2$ of the switch piston 25 effects the rightward translatory movement thereof, and it is, of course, apparent that the centering piston 20 is concertedly movable with said switch piston toward its rightward translated position. During the rightward translatory movement of the switch piston 25, the cam surface 34 is drivingly engaged with the switch member follower end 40 to effect the upward movement of the switch member 38 and the engagement of the switch member contact 41 with the interior end of the terminal 37 to complete the electrical circuit and energize the driver-warning dash lamp.

From the foregoing, it is now apparent that a novel control valve 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, means for comparing the magnitudes of separate fluid pressures supplied to said housing and movable therein from a normally centered position toward opposed translated positions in response to oppositely acting differentials in excess of a predetermined amount between the magnitudes of the supplied fluid pressures acting thereon, metering means defining with said housing a pressure fluid flow passage therethrough for one of the supplied fluid pressures and movable in said housing for controlling the application through said flow passage of the one supplied fluid pressure, said metering means being initially movable in response to the one supplied fluid pressure and the applied fluid pressure of a predetermined value acting thereon toward a position isolating the one supplied fluid pressure in said flow passage from the applied fluid pressure and being thereafter further movable in response to increases in the one supplied fluid pressure in excess of the predetermined value toward a metering position effecting a metered increase in the applied fluid pressure in said flow passage in a predetermined ratio with the increased supplied fluid pressure in excess of the predetermined value, passage means in said metering means in bypass relation with said flow passage having one end connected in open pressure fluid communication with the one supplied fluid pressure and the other end thereof for connection in pressure fluid communication with the applied fluid pressure, and said first-named means including means movable in said other end of said passage means for controlling pressure fluid communication therethrough between the one supplied fluid pressure and the applied fluid pressure, said included means being movable toward a bypass position establishing open pressure fluid communication through said passage means between the one supplied fluid pressure and the applied fluid pressure to bypass said metering means and obviate the metering actuation thereof upon the movement of said first-named means toward one of its translated positions when the magnitude of one of the supplied fluid pressure and the other of the supplied fluid pressures exceed that of the other of the one and other supplied fluid pressures acting on said first-named means by the predetermined amount.

2. A control valve comprising a housing, means movable in said housing for comparing the magnitudes of separate fluid pressures supplied thereto, metering means movable in said housing and defining with said housing a pressure fluid flow passage therethrough for one of the supplied fluid pressures, said metering means being generally operable to effect the application through said flow passage of a metered applied fluid pressure in response to the one supplied fluid pressure acting thereon upon preselected conditions, passage means in said metering means for connection in bypass relation with said flow passage between the one supplied fluid pressure and the applied fluid pressure, and said first-named means including means for controlling said passage means, said included means and said first-named means being movable in response to the one supplied fluid pressure in said passage means acting on said included means to a translated position establishing the open pressure fluid communication through said passage means between the one supplied fluid pressure and the applied fluid pressure to bypass said metering means and prevent metering actuation thereof in the event of a failure of the other of the supplied fluid pressures acting on said first-named means.

3. A control valve according to claim 2, comprising other means movable in said housing for engagement with said housing and said first-named means and subjected to the applied fluid pressure, said other means being urged in response to the applied fluid pressure acting thereon toward engagement with said housing and with said first-named means to oppose movement of said first-named means toward another translated position in a direction opposite to its first-named translated position.

4. A control valve according to claim 2, comprising a pair of opposed areas on said first-named means for respective subjection to the one supplied fluid pressure in said passage means and the other supplied fluid pressure, said first-named means being movable toward its translated position when the magnitude of the one supplied fluid pressure acting on one of said opposed areas exceeds that of the other supplied fluid pressure acting on the other of said opposed areas by a predetermined amount.

5. A control valve according to claim 2, wherein said other end of said passage means includes a bore in said metering means, said included means being movable in said bore and normally interrupting pressure fluid communication therethrough between the one supplied fluid pressure and the applied fluid pressure, and said included means being movable toward its translated position to establish the open pressure fluid communication through said bore between the one supplied fluid pressure and the applied fluid pressure in response to the movement of said first named means to its one translated position.

6. A control valve according to claim 5, wherein said included means includes valve means normally engaged with said bore to interrupt pressure fluid communication therethrough between the one supplied fluid pressure and the applied fluid pressure, said valve means being disengaged from said bore upon the movement of said included means with said first-named means to its translated position to establish the open pressure fluid communication through said bore between the one supplied fluid pressure and the applied fluid pressure.

7. A control valve according to claim 6, wherein the sealing engagement of said valve means with said bore defines an effective area on said included means subjected to the one supplied fluid pressure, and another effective area on said first-named means opposed to said first-named effective area and subjected to the other supplied fluid pressure, said first-named means being movable toward its one-translated position when the magnitude of the one supplied fluid pressure acting on said first-named effective area exceeds that of the other supplied fluid pressure acting on said other effective area by a predetermined amount.

8. A control valve according to claim 7, comprising other means movable in said housing for engagement with said housing and said first-named means, said other means defining a third area subjected to the applied fluid pressure and additive to said first area, said second area being greater than said first area, and said other means being urged in response to the applied fluid pressure acting on said third area toward engagement with said housing and said first-named means to oppose movement of said first-named means in response to the other supplied fluid pressure acting on said second area.

9. A control valve according to claim 2, comprising sealing means engaged between said included means and said passage means normally interrupting pressure fluid communication through said passage means between the one supplied fluid pressure and the applied fluid pressure, said sealing means being disengaged from one of said included means and said passage means upon the movement of said first-named means to its translated position to open said passage means and establish the open pressure fluid communication therethrough between the one supplied fluid pressure and the applied fluid pressure.

10. A control valve according to claim 2, comprising a valve seat on said first-named means about said passage means, valve means on said included means normally engaged with said valve seat to close said passage means, said valve means being urged toward a position disengaged from said valve seat to open said passage means and establish the pressure fluid communication therethrough between the one supplied fluid pressure and the applied fluid pressure upon the movement of said first-named means toward its translated position.

11. A control valve comprising a housing having a pair of inlet ports and an outlet port therein, means in said housing defining a valve seat between one of said inlet ports and said outlet port, a metering piston movable in said housing between said one inlet port and said outlet port including valve mans for engagement with said valve seat, said metering piston defining a flow passage between said one inlet port and said outlet port controlled by said valve means, resilient means urging said piston means toward a normal position in said housing to disengage said valve means from said valve seat and establish open pressure fluid communication through said flow passage between said one inlet port and said outlet port, said metering piston being movable against the force of said resilient means in response to fluid pressures at said one inlet port and said outlet port of a predetermined value toward an isolating position engaging said valve means with said valve seat to close said flow passage and interrupt pressure fluid communication between said one inlet port and said outlet port and being thereafter further movable in response to increases in the fluid pressure at said one inlet port in excess of the predetermined value and assisted by the force of said resilient mans toward a metering position disengaging said valve means from said valve seat to open said flow passage and establish metered pressure fluid communication between said one inlet port and said outlet port effecting a metered increase of the fluid pressure at said outlet port in a predetermined ratio with the fluid pressure at said one inlet port in excess of the predetermined value, passage means in said metering piston having one end connected in open pressure fluid communication with said one inlet port and the other end thereof for connection in pressure fluid communication with said outlet port in bypass relation with said flow passage, other piston means for comparing the magnitudes of the fluid pressures at said one inlet port and the other of said inlet ports and movable in said housing between said one inlet port and said outlet port from a normally centered position toward opposed translated positions in response to oppositely acting differentials in excess of a predetermined amount between the magnitudes of the fluid pressures at said one and other inlet ports acting thereon, said other piston means including a portion movable in said other end of said passage means and subjected to the fluid pressure at said one inlet port wherein said portion normally closes said passage means to interrupt pressure fluid communication therethrough between said one inlet port and said outlet port when said other piston means is in its centered position, and another portion on said other piston means opposed to said first-named portion and subjected to the fluid pressure at said other inlet port, said first-named portion being movable toward a position displaced from said passage means establishing pressure fluid communication therethrough between said one inlet port and said outlet port in bypass relation with said flow passage to obviate the metering actuation of said metering piston in response to the movement of said other piston means toward one of its opposed translated positions when the magnitude of the fluid pressure at said one inlet port acting on said first-named portion exceeds that of the fluid pressure at said other inlet port acting on said other portion by the predetermined amount.

12. A control valve comprising a housing, a pressure fluid flow passage in said housing, metering means generally operable to effect the application through said flow passage of a metered applied fluid pressure in response to fluid pressure supplied thereto upon preselected conditions, passage means in said metering means in bypass relation with said flow passage for connection in open pressure fluid communication between the one supplied fluid pressure and the applied fluid pressure, means for controlling said passage means including other means movable in said housing and said passage means for comparing the magnitude of the one supplied fluid pressure with another fluid pressure separately supplied to said housing, said other means being movable in response to the one supplied fluid pressure acting thereon toward a translated position establishing the open pressure fluid communication through said passage means between the one supplied fluid pressure and the applied fluid pressure to bypass said metering means and prevent the metering actuation thereof in the event of the failure of the other supplied fluid pressure acting on said other means.

13. A control valve comprising a housing having a pair of inlet chambers and an outlet chamber therein, metering means in said housing between one of said inlet chambers and said outlet chamber and defining a flow passage therebetween, said metering means being generally operable to meter fluid pressure from said one inlet chamber through said flow passage to establish a metered applied fluid pressure in said outlet chamber, passage means in said metering means in bypass relation with said flow passage and connected between said one inlet chamber and said outlet chamber, other means for comparing the magnitudes of the respective fluid pressures in said inlet chambers including means movable in said passage means and normally interrupting pressure fluid communication therethrough between said one inlet chamber and said outlet chamber, said other means being movable in response to the fluid pressure in said one inlet chamber acting on said included means toward a translated position displacing said included means from said passage means and establishing open pressure fluid communication therethrough between said one inlet chamber and said outlet chamber to bypass said flow passage and prevent the metering actuation of said metering means in the event of the failure of fluid pressure in the other of said inlet chambers acting on said other means in opposition to the fluid pressure in said one inlet chamber acting on said included means.

14. A control valve comprising a housing having a pair of inlet ports and an outlet port, metering means defining with said housing a pressure fluid flow passage between one of said inlet ports and said outlet port and generally operable to effect the application through said flow passage of fluid pressure at said one inlet port to establish a metered fluid pressure at said outlet port, passage means in said metering means in bypass relation with said flow passage and having one end subjected to fluid pressure at said one inlet port and the other end thereof adapted for subjection to the fluid pressure at said outlet port, comparator means movable in said housing for comparing the magnitudes of the respective fluid pressures at said inlet ports including means normally in sealing engagement with said metering means about said passage means other end to interrupt pressure fluid communication through said passage means between the fluid pressure at said one inlet port and the applied fluid pressure at said outlet port, said comparator means being movable toward a translated position in response to the fluid pressure at said one inlet port acting on said included means to displace said included means from sealing engagement with said metering means opening said passage means to establish open pressure fluid communication therethrough between the fluid pressure at said one inlet port and the applied fluid pressure at said outlet port bypassing said flow passage in order to prevent the metering actuation of said metering means upon the failure of the fluid pressure at the other of said inlet ports acting on said comparator means.

UNITED STATES PATENT OFFICE

CERTIFICATE OF CORRECTION

Patent No. 3,608,977          Issued September 28, 1971

Raymond J. Kersting

It is certified that error appears in the above-identified patent and that said Letters Patent are hereby corrected as shown below:

Column 1, line 73, including "and" delete down to and including the comma -- , -- first occurrence, in line 75. Column 3, line 74, "propositioning" should read -- proportioning --. Column 4, line 61, "Po oA" should read -- Po $A_6$ --. Column 5, line 17, after "$P_2$" insert a paranthesis -- ( --. Column 6, line 7, after "available" insert -- fluid --; line 7, "Po" should read -- the vehicle --. Column 7, line 68, including "said" delete down to and including -- of -- in line 69. Column 8, line 1, including "in" delete down to and including -- position -- in line 3; line 20, after "its" delete -- one --. Column 9, line 3, "mans" should read -- means --.

Signed and sealed this 9th day of January 1973.

(SEAL)
Attest:

EDWARD M. FLETCHER, JR.
Attesting Officer

ROBERT GOTTSCHALK
Commissioner of Patents